United States Patent
Halasa et al.

(10) Patent No.: US 7,285,605 B1
(45) Date of Patent: Oct. 23, 2007

(54) BATCH PROCESS FOR SYNTHESIZING RUBBERY POLYMERS HAVING A HIGH TRANS MICROSTRUCTURE CONTENT

(75) Inventors: Adel Farhan Halasa, Bath, OH (US); Wen-Liang Hsu, Cuyahoga Falls, OH (US); Jean Steininger Clites, North Canton, OH (US); Timothy John Wolfgang, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/468,427

(22) Filed: Aug. 30, 2006

(51) Int. Cl.
*C08F 4/52* (2006.01)
*C08F 236/10* (2006.01)

(52) U.S. Cl. .................. 526/87; 526/176; 526/177; 526/340; 525/272

(58) Field of Classification Search ............. 525/272; 526/87, 176, 177, 340
See application file for complete search history.

(56) References Cited

U.S. PATENT DOCUMENTS

| | | |
|---|---|---|
| 3,846,385 A | 11/1974 | Hargis et al. |
| 3,903,019 A | 9/1975 | Hargis et al. |
| 3,992,561 A | 11/1976 | Hargis et al. |
| 4,020,115 A | 4/1977 | Hargis et al. |
| 4,028,484 A | 6/1977 | Morton et al. |
| 4,033,900 A | 7/1977 | Hargis et al. |
| 4,048,427 A | 9/1977 | Hargis et al. |
| 4,297,240 A | 10/1981 | Bingham et al. |
| 4,302,568 A | 11/1981 | Bingham et al. |
| 4,307,218 A | 12/1981 | Bingham et al. |
| 4,355,156 A | 10/1982 | Bingham et al. |
| 4,503,204 A | 3/1985 | Bingham et al. |
| 4,616,065 A | 10/1986 | Hargis et al. |
| 4,670,502 A | 6/1987 | Hargis et al. |
| 5,086,136 A * | 2/1992 | Takashima et al. ......... 526/177 |
| 5,100,965 A | 3/1992 | Hsu et al. |
| 5,216,080 A | 6/1993 | Suzuki et al. |
| 5,219,942 A | 6/1993 | Suzuki et al. |
| 5,326,838 A | 7/1994 | Ruiz Santa Quiteria et al. |
| 5,753,579 A | 5/1998 | Jalics et al. |
| 6,103,842 A | 8/2000 | Halasa et al. |
| 6,359,088 B1 | 3/2002 | Halasa et al. |
| 6,608,154 B2 | 8/2003 | Halasa et al. |
| 6,627,715 B2 | 9/2003 | Halasa et al. |
| 6,872,772 B2 * | 3/2005 | Steiner et al. ............. 524/526 |
| 2002/0045720 A1 | 4/2002 | Halasa et al. |
| 2002/0183469 A1 | 12/2002 | Halasa et al. |
| 2003/0153698 A1 | 8/2003 | Halasa et al. |
| 2005/0022914 A1 | 2/2005 | Maier et al. |
| 2005/0181935 A1 | 8/2005 | Halasa et al. |
| 2005/0272852 A1 | 12/2005 | Sandstrom et al. |
| 2006/0106149 A1 | 5/2006 | Sandstrom et al. |

* cited by examiner

*Primary Examiner*—Fred Teskin
(74) *Attorney, Agent, or Firm*—Wood, Herron & Evans, LLP

(57) ABSTRACT

The present invention is directed to a batch process for synthesizing rubbery polymers, such as styrene-butadiene rubber, having a high trans microstructure. In one embodiment, the batch process involves mixing a catalyst system with styrene and butadiene monomers in a single reactor, with additional butadiene monomer being added after a desired period of time to further drive styrene conversion and, thus, provide a desirable high trans rubbery polymer, e.g., styrene-butadiene rubber. The copolymerization process can be conducted at a temperature in the range of about 20° C. to about 180° and over a period of about 1 to about 4 hours. The catalyst system can include (a) an organolithium compound, (b) a group IIa metal salt, and (c) an organoaluminum compound. The catalyst system may further optionally include an amine compound and/or an organomagnesium compound.

14 Claims, No Drawings

BATCH PROCESS FOR SYNTHESIZING RUBBERY POLYMERS HAVING A HIGH TRANS MICROSTRUCTURE CONTENT

FIELD OF THE INVENTION

The present invention is directed to a batch process including a catalyst system for synthesizing rubbery polymers, such as styrene-butadiene rubber, having a high trans microstructure content that can be utilized in tire tread rubbers.

BACKGROUND OF THE INVENTION

It is desirable for tire manufacturers to produce tires that have good wet skid resistance, low rolling resistance, tear strength, and good wear characteristics. It has traditionally been difficult to improve the wear characteristics of a tire without sacrificing wet skid resistance and traction characteristics. These properties depend, to a great extent, on the dynamic viscoelastic properties of the rubbers utilized in making the tire. Such viscoelastic properties are controlled largely by both the microstructure and macrostructure of the elastomer.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers that undergo a large energy loss have generally been utilized in the tread of the tire. In order to balance these two viscoelastically inconsistent properties, mixtures of various types of synthetic and natural rubber are normally utilized in tire treads. For instance, various mixtures of styrene-butadiene rubber are commonly used as a rubbery material for automobile tire treads.

It has been conventionally believed to be desirable, e.g., for styrene-butadiene rubber, when utilized in tire tread compounds, to have a high level of vinyl content (1,2-microstructure) or a high level of styrene content, i.e., between 35% to 50% styrene content. In the case of high styrene content, it is desirable to have low vinyl content. To this end, styrene-butadiene rubbers are often synthesized by solution polymerization that is conducted in the presence of a catalyst system, including one or more modifying agents. In contrast to providing high vinyl or high styrene content rubbery polymers, it is believed that rubbery polymers having high trans microstructure contents may provide a more desirable balance of tire tread properties due to its crystallinity and low vinyl content. Polymerization of these rubbery polymers can be carried out utilizing batch, semi-continuous, or continuous techniques.

Batch processes are of considerable importance to the tire industry. A wide variety of certain types of polymers are manufactured in batch operations. Batch processes are typically used when production volumes are low, isolation is required for reasons of sterility or safety, and/or when the materials involved are difficult to handle. However, with recent trends in building small, flexible plants that are close to the markets of consumption, there has been renewed interest in batch processing. In the face of increased competition, process optimization is a natural choice for reducing production costs, improving product quality, reducing product variability, and ease of scale-up.

Thus, it would be desirable to provide an improved batch process for synthesizing rubbery polymers, such as styrene-butadiene rubber, having a high trans microstructure content, wherein the rubbery polymers can provide desirable wear properties without substantially sacrificing other performance characteristic(s), e.g., traction properties.

SUMMARY OF THE INVENTION

In accordance with an embodiment of the present invention, a batch process is provided for synthesizing rubbery polymers, such as styrene-butadiene rubber (SBR), having a high trans microstructure content that can be utilized in tire tread rubbers. Such batch process is carried out in a reactor and includes polymerization of one or more conjugated diolefin monomers with vinyl aromatic monomers in the presence of a catalyst system in the reactor. Additional conjugated diolefin monomer, e.g., 1,3 butadiene, may be added to the reactor after a desired period of time to further convert unreacted vinyl aromatic monomer conversion, e.g., styrene, to the rubbery polymer, such as SBR, having the high trans microstructure. The copolymerization process can be conducted at a temperature in the range of about 20° C. to about 180° and over a period of about 1 to about 4 hours.

The catalyst system can include (a) an organolithium compound, (b) a group IIa metal salt that can be selected from the group consisting of group IIa metal salts of amino glycol and group IIa metal salts of glycol ethers, and (c) an organoaluminum compound. The catalyst system may further optionally include an amine compound and/or an organomagnesium compound.

It is believed that the incorporation of additional butadiene into the reactor in combination with the batch process temperature control and/or the catalyst system provides a synergistic effect for synthesizing rubbery polymers, such as styrene-butadiene rubber, having a high trans microstructure content. These rubbery polymers provide desirable wear properties without substantially sacrificing other performance characteristic(s), e.g., traction properties.

By virtue of the foregoing, there is thus provided a batch process including a catalyst system for synthesizing rubbery polymers, such as styrene-butadiene rubber, having a high trans microstructure content that can be utilized in tire tread rubbers.

DETAILED DESCRIPTION

A batch process is provided for synthesizing rubbery polymers, such as styrene-butadiene rubber (SBR), having a high trans microstructure content that can be utilized in tire tread rubbers. Such batch process is carried out in a reactor and includes polymerization of one or more conjugated diolefin monomers with vinyl aromatic monomers in the presence of a catalyst system, as more fully discussed below. For purposes herein, a rubbery polymer includes a high trans microstructure content if the trans microstructure content, e.g., trans 1,4 polybutadiene, of a polymerized conjugated diolefin monomer, such as 1,3 butadiene, is greater than 60% of its total microstructure content.

The polymerizations in the batch process are typically carried out in a hydrocarbon solvent, such as one or more aromatic, paraffinic or cycloparaffinic compounds. The solvents generally will contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. In the solution polymerizations, there typically will be from 5 to 30 weight percent monomers in the polymerization medium, or premix. Such polymerization media are comprised of the organic solvent and monomers. In another example, the polymerization medium may contain from 10 to 25 weight percent monomers. In yet another example, the polymerization medium can contain 15 to 20 weight percent monomers.

The solution styrene-butadiene rubbers made utilizing the catalyst system include repeat units that are derived from the conjugated diolefin monomers and optionally vinyl aromatic monomers, such as styrene. The styrene-butadiene rubbers will typically contain from about 2 weight percent to about 50 weight percent styrene and from about 50 weight percent to about 98 weight percent 1,3-butadiene. However, in some cases, the amount of styrene included will be as low as about 1 weight percent. In another example, the styrene-butadiene rubbers will contain from about 3 weight percent to about 35 weight percent styrene and from about 65 weight percent to about 97 weight percent 1,3-butadiene. In another example, the styrene-butadiene rubbers will contain less than about 35 weight percent.

Styrene-butadiene copolymer resins containing from about 50 weight percent to about 95 weight percent styrene and from about 5 weight percent to about 50 weight percent 1,3-butadiene can also be synthesized using the catalyst system. Such copolymers having glass transition temperatures within the range of 7° C. to 70° C. can be used as toner resins.

In the styrene-butadiene rubbers containing less than 35 weight percent bound styrene, the distribution of repeat units derived from styrene and butadiene is essentially random. The term "random" as used herein means that less than 10 percent of the total quantity of repeat units derived from styrene are in blocks containing more than five styrene repeat units. In other words, more than 90 percent of the repeat units derived from styrene are in blocks containing five or fewer repeat units. About 20% of the repeat units derived from styrene will be in blocks containing only one styrene repeat unit. Such blocks containing one styrene repeat unit are bound on both sides by repeat units that are derived from 1,3-butadiene.

In styrene-butadiene rubbers containing less than about 20 weight percent bound styrene, less than 4 percent of the total quantity of repeat units derived from styrene are in blocks containing five or more styrene repeat units. In other words, more than 96 percent of the repeat units derived from styrene are in blocks containing less than five repeat units. In such styrene-butadiene rubbers, over 25 percent of repeat units derived from styrene will be in blocks containing only one styrene repeat unit, over 60 percent of the repeat units derived from styrene will be in blocks containing less than 3 repeat units, and over 90 percent of the repeat units derived from styrene will be in blocks containing 4 or fewer repeat units.

In styrene-butadiene rubbers containing less than about 10 weight percent bound styrene, less than 1 percent of the total quantity of repeat units derived from styrene are in blocks containing 5 or more styrene repeat units. In other words, more than 99 percent of the repeat units derived from styrene are in blocks containing 4 or less repeat units. In such styrene-butadiene rubbers, at least about 50 percent of repeat units derived from styrene will be in blocks containing only one styrene repeat unit and over about 85 percent of the repeat units derived from styrene will be in blocks containing less than 3 repeat units.

The styrene-butadiene copolymers also tend to have a consistent composition throughout their polymer chains. In other words, the styrene content of the polymer will be about the same from the beginning to the end of the polymer chain. In one example, no segments of at least 100 repeat units within the polymer will have a styrene content which differs from the total styrene content of the polymer by more than about 10 percent. In another example, such styrene-butadiene copolymers will contain no segments having a length of at least 100 repeat units that have a styrene content which differs from the total styrene content of the polymer by more than about 5 percent. Additionally, the styrene-butadiene copolymers of this invention having bound styrene contents of up to at least about 42 percent are soluble in mixed hexane solvents.

The polymerizations of this invention are initiated in a single reactor by adding a catalyst system to a polymerization medium, or premix, containing the monomers to be polymerized. The catalyst system may be added to the premix in any desired amount. In one example, the catalyst system is provided in an amount of about 0.100 mmole to about 0.900 mmol/per 100 parts by weight of total monomer. In another example, the catalyst system is provided in an amount of about 0.200 mmole to about 0.700 mmol/per 100 parts by weight of total monomer. In yet another example, the catalyst system is provided in an amount of about 0.300 mmole to about 0.500 mmol/per 100 parts by weight of total monomer.

Initial polymerization is conducted for a length of time sufficient to generally permit substantially complete polymerization of monomers. In other words, the polymerization is normally carried out until high conversions are attained. However, during polymerization of, for example, styrene-butadiene rubber, butadiene can be consumed initially much more rapidly than the styrene, particularly, when using an equal molar mixture of butadiene and styrene. Accordingly, in an embodiment of this batch process, additional butadiene monomer may be added after a desired period of time to further drive styrene conversion.

The amount of additional butadiene may include about 0.01% to about 30% of the initial % by weight butadiene in the styrene/butadiene premix. In another example, the additional butadiene may include about 1% to about 30% butadiene of the initial % by weight butadiene. In another example, the additional butadiene may include about 5% to about 25% butadiene of the initial % by weight butadiene. In yet another example, the additional butadiene may include about 10% to about 20% butadiene of the initial % by weight butadiene. Additional butadiene may be added when substantially all of the butadiene has been reacted, yet, additional styrene remains. In one example, additional butadiene may be added when less than about 20% of the initial % by weight butadiene remains from the styrene/butadiene premix. In another example, additional butadiene may be added when less than about 10% of the initial % by weight butadiene remains. In another example, additional butadiene may be added when less than about 5% of the initial % by weight butadiene remains. In yet another example, additional butadiene may be added when less than about 3% of the initial % by weight butadiene remains. After the additional butadiene is added, polymerization is allowed to continue for an additional length of time sufficient to permit substantially complete polymerization of monomers.

Polymerization can be carried out from about 1 to about 4 hours, which includes the period of polymerization after the additional butadiene. The polymerization temperature utilized through the batch process can vary over a broad temperature range of from about 20° C. to about 180° C. In another example, a temperature within the range of about 40° C. to about 120° C. can be utilized. In yet another example, the polymerization temperature can be within the range of about 70° C. to about 100° C. In one example, the temperature is from about 70° C. to about 100° C. during the addition of the butadiene. The pressure used will normally be sufficient to maintain a substantially liquid phase under the conditions of the polymerization reaction.

After the polymerization or copolymerization has been completed, the styrene-butadiene rubber, for example, can be recovered from the organic solvent. The rubbery polymer, such as styrene-butadiene rubber, can be recovered from the organic solvent and residue by means such as decantation, filtration, centrification, and others known to those having ordinary skill in the art. It can be desirable to precipitate the polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" or terminates the living polymer by inactivating lithium end groups. The polymerization can also be terminated with other conventional noncoupling types of terminators, such as water, an acid, or with a coupling agent, for example. After the polymer is recovered from the solution, steam-stripping can be employed to reduce the level of volatile organic compounds in the rubber.

There are certain benefits in tire tread compounds derived from the rubbery polymers using the batch process. For example, styrene-butadiene rubber made according to the batch process can be blended with natural rubber to make tread compounds for passenger tires that exhibit desirable rolling resistance, traction, tear, and tread wear characteristics. In cases where tread wear is of great importance, high cis-1,4-polybutadiene can also be included in the blend. In any case, the styrene-butadiene rubbers of this invention can be used to improve the traction, tread wear and rolling resistance of tires made therewith.

The catalyst system can include (a) an organolithium compound, (b) a group IIa metal salt that can be selected from the group consisting of group IIa metal salts of amino glycol and group IIa metal salts of glycol ethers, and (c) an organoaluminum compound, and optionally, an amine compound and/or an organomagnesium compound.

The organolithium compounds of the catalyst system can include the monofunctional and multifunctional initiator types known for polymerizing the conjugated diolefin monomers. The multifunctional organolithium initiators can be either specific organolithium compounds or can be multifunctional types that are not necessarily specific compounds but rather represent reproducible compositions of regulable functionality. The organolithium initiator can also be a functionalized compound.

The choice of initiator can be governed by the degree of branching and the degree of elasticity desired for the polymer, the nature of the feedstock, and the like. With regard to the feedstock employed as the source of conjugated diene, for example, the multifunctional initiator types generally are selected when a low concentration diene stream is at least a portion of the feedstock since some components present in the unpurified low concentration diene stream may tend to react with carbon lithium bonds to deactivate the activity of the organolithium compound, thereby necessitating the presence of sufficient lithium functionality so as to override such effects.

The multifunctional organolithium compounds which can be used include those prepared by reacting an organomonolithium compounded with a multivinylphosphine or with a multivinylsilane, such a reaction typically being conducted in an inert diluent, such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound after reaction of the primary components. Alternatively, the reaction can be conducted in the presence of a minor amount of the solubilizing monomer. The relative amounts of the organomonolithium compound and the multivinylsilane or the multivinylphosphine generally should be in the range of about 0.33 to 4 moles of organomonolithium compound per mole of vinyl groups present in the multivinylsilane or multivinylphosphine employed. It is noted that such multifunctional initiators are commonly used as mixtures of compounds rather than as specific individual compounds.

The organomonolithium compounds can include ethyl lithium, isopropyl lithium, n-butyllithium, sec-butyllithium, n-heptyllithium, tert-octyl lithium, n-eicosyl lithium, phenyl lithium, 2-naphthyllithium, 4-butylphenyllithium, 4-tolyllithium, 4-phenylbutyllithium, cyclohexyl lithium, and others known to those having ordinary skill in the art.

The multivinylsilane compounds can include tetravinylsilane, methyltrivinyl silane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and others known to those having ordinary skill in the art.

The multivinylphosphine compounds can include trivinylphosphine, methyldivinylphosphine, dodecyldivinylphosphine, phenyldivinylphosphine, cyclooctyldivinylphosphine, and others known to those having ordinary skill in the art.

Other multifunctional polymerization initiators can be prepared by utilizing an organomonolithium compound further in combination with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive, and then adding the multivinyl aromatic compound. Any of the conjugated dienes or monovinyl aromatic compounds described can be employed. The ratio of conjugated diene or monovinyl aromatic compound additive employed, in one example, should be in the range of about 2 to 15 moles of polymerizable compound per mole of organolithium compound. The amount of multivinylaromatic compound employed, in one example, should be in the range of about 0.05 to 2 moles per mole of organomonolithium compound.

The multivinyl aromatic compounds can include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and others known to those having ordinary skill in the art. In one example, the multivinyl aromatic compound includes a divinyl aromatic hydrocarbon containing up to 18 carbon atoms per molecule. In another example, the divinyl aromatic hydrocarbon can include divinylbenzene, as either the ortho, meta or para isomer, commercial divinylbenzene, which is a mixture of the three isomers, or other compounds such as the ethyl styrenes.

Other types of multifunctional lithium compounds can be used, such as those prepared by contacting a sec- or tert-organomonolithium compound with 1,3-butadiene, at a ratio of about 2 to 4 moles of the organomonolithium compound per mole of the 1,3-butadiene, in the absence of added polar material, with the contacting, for example, being conducted in an inert hydrocarbon diluent. In another example, the contacting is conducted without the diluent.

Alternatively, specific organolithium compounds can be used as initiators, if desired, in the preparation of the rubbery polymers. These can be represented by R(Li)x wherein R represents a hydrocarbyl radical containing from 1 to 20 carbon atoms, and wherein x is an integer of 1 to 4. The organolithium compounds can include methyl lithium, isopropyl lithium, n-butyllithium, sec-butyllithium, hexyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and others known to those having ordinary skill in the art.

The organolithium compound can be an alkylsilyloxy protected functional lithium compound as described in U.S. Provisional Application Ser. No. 60/234,686. The teachings of U.S. Provisional Application Ser. No. 60/234,686 are incorporated herein by reference. For instance, the initiator can be an alkylsilyloxy protected functional lithium initiator of the structural formula:

wherein X represents a group IVa element selected from carbon, germanium, or tin; wherein R represents alkyl groups that can be the same or different and that contain from 1 to about 8 carbon atoms; and wherein A represents an akylene group; or:

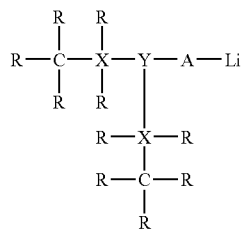

wherein X represents a group IVa element selected from carbon, germanium, or tin; wherein Y represents phosphorous or nitrogen; wherein R represents alkyl groups that can be the same or different and that contain from 1 to about 8 carbon atoms; and wherein A represents an alkylene group; or (c):

wherein R represents alkyl groups that can be the same or different and that contain from 1 to about 8 carbon atoms, and wherein A represents an alkylene group. The alkylene group can be straight chained or branched. For instance, A can represent a straight chained alkylene group of the structural formula —$(CH_2)_n$— or it can represent a branched alkylene group, such as:

—[—$CH_2$—$CR_2$—$CH_2$—]— wherein R represents alkyl groups that can be the same or different and that contain from 1 to about 8 carbon atoms. In one example, R represents an alkyl group containing from 1 to about 4 carbon atoms. In another example, R represents methyl groups.

The alkylsilyloxy protected functional lithium initiator will typically be of the structural formula:

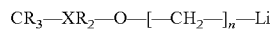

wherein X represents a group IVa element selected from carbon, silicon, germanium, or tin; wherein n represents an integer from 1 to 10; wherein R represents alkyl groups that can be the same or different and that contain from 1 to about 8 carbon atoms; or an alkylsilyloxy protected functional lithium compound of the structural formula:

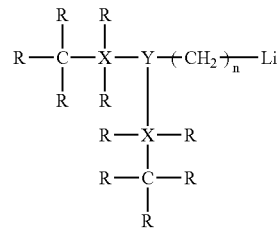

wherein X represents a group IVa element selected from carbon, silicon, germanium, or tin; wherein Y represents phosphorous or nitrogen; wherein n represents an integer from 1 to 10; wherein R represents alkyl groups that can be the same or different and that contain from 1 to about 8 carbon atoms. These rubbery polymers will accordingly normally contain a "living" lithium chain end.

In another example, the alkylsilyloxy protected functional lithium initiator may be of the structural formula:

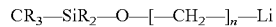

wherein n represents an integer from 1 to 10, and wherein R represents alkyl groups that can be the same or different and that contain from 1 to about 8 carbon atoms.

The group IIa metal salts used in the catalyst systems can be selected from the group consisting of group IIa metal salts of amino glycols or group IIa metal salts of glycol ethers. The group IIa metal salts of amino glycols may be represented by the structural formula:

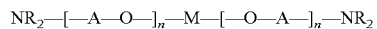

wherein the R groups can be the same or different and represent alkyl groups (including cycloalkyl groups), aryl groups, alkaryl groups or arylalkyl groups; wherein M represents a group IIa metal selected from beryllium, magnesium, calcium, strontium, or barium; wherein n represents an integer from 2 to about 10; and wherein A represents an alkylene group that contains from about 1 to about 6 carbon atoms. In one example, M represents strontium or barium. In another example, M represents barium. In one example, A represents an alkylene group that contains from 2 to about 4 carbon atoms. In another example, A represents an ethylene group that contains from 2 to about 4 carbon atoms. In cases where R represents an alkyl group, the alkyl group will typically contain from 1 to about 12 carbon atoms. In one example, the R represents an alkyl group that contains from about 1 to about 8 carbon atoms or a cycloalkyl group that contains from about 4 to about 8 carbon atoms. In another example, R represent an alkyl group that contains from about 1 to about 4 carbon atoms. In another example, n represents an integer from about 2 to about 4. In cases where R represents an aryl group, an alkaryl group, or arylalkyl group, the aryl group, alkaryl group, or arylalkyl group will typically contain from about 6 to about 12 carbon atoms.

In cases where R represents cycloalkyl groups, the group IIa metal salt will be of the structural formula:

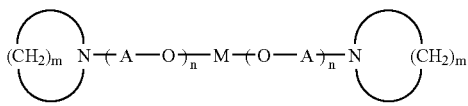

wherein m represents an integer from 4 to about 8; wherein n represents an integer from 2 to about 10; wherein M represents a group IIa metal selected from beryllium, magnesium, calcium, strontium, or barium; wherein A represents an alkylene group that contains from about 1 to about 6 carbon atoms, and wherein the A groups can be the same or different. In one example, m represents an integer from 5 to about 7, n represents an integer from about 2 to about 4, A represents an alkylene group that contains from 2 to about 4 carbon atoms. In another example, A represents ethylene groups. In another example, M represents strontium or barium. In yet another example, M represents barium.

Some representative examples of barium salts where R represents cycloalkyl groups include:

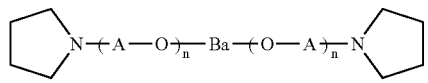

and

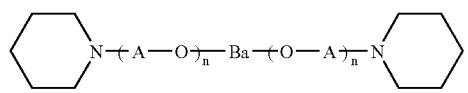

and

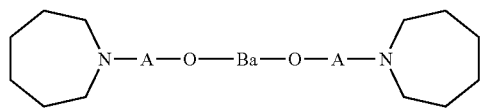

wherein A represents ethylene groups, wherein the A groups can be the same or different, and wherein n represents the integer 2.

The barium salt can also contain a cycloalkyl group that contains an oxygen atom. For example, the barium salt can be of the structural formula:

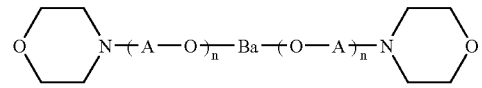

wherein A represents ethylene groups, wherein the A groups can be the same or different, and wherein n represents the integer 2.

The group IIa metal salt of glycol ethers may be represented by the structural formula:

$$M\text{---}((O\text{---}(CH_2)_n)_m\text{---}O\text{---}(CH_2)_x\text{---}CH_3)_2$$

wherein M represents a group IIa metal selected from beryllium, magnesium, calcium, strontium, or barium; wherein n represents an integer from 2 to 10; wherein m represents an integer from 1 to 6; and wherein x represents an integer from 1 to 12. In one example, n represents an integer from 2 to about 4, m represents an integer from 2 to 8, and x represents an integer from 1 to 8. In another example, n represents an integer from 2 to 3, m represents an integer from 2 to 4, and x represents an integer from 1 to 4. In another example, M represents strontium or barium. In yet another example, M represents barium.

In another embodiment, the group IIa metal salt is the barium salt of di(ethyleneglycol)ethyl ether which is of the structural formula:

$$Ba\text{---}(O\text{---}CH_2\text{---}CH_2\text{---}O\text{---}CH_2\text{---}CH_2\text{---}O\text{---}CH_2\text{---}CH_3)_2$$

In another embodiment, the group IIa metal salt is

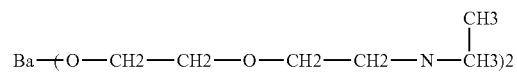

In other embodiments, the group IIa metal salts include barium salts of tri(ethyleneglycol)ethyl ethers and barium salts of tetra(ethyleneglycol)ethyl ethers.

The molar ratio of the organolithium compound to the group IIa metal salt will typically be within the range of about 0.1:1 to about 20:1. In one example, the molar ratio is within the range of 0.5:1 to about 15:1. In another example, the molar ratio of the organolithium compound to the group IIa metal salt is within the range of about 1:1 to about 6:1. In yet another example, the molar ratio is within the range of about 2:1 to about 4:1.

The organolithium compound will normally be present in the polymerization medium in an amount that is within the range of about 0.01 to about 1 phm (parts by 100 parts by weight of total monomer). In one example, from about 0.01 phm to about 0.1 phm of the organolithium compound can be utilized. In another example, from about 0.025 phm to about 0.07 phm of the organolithium compound in the polymerization medium can be utilized.

The organoaluminum compounds of the catalyst system can be represented by the structural formula:

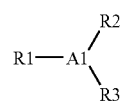

in which R1 is selected from alkyl groups (including cycloalkyl), aryl groups, alkaryl groups, arylalkyl groups, or hydrogen; R2 and R3 being selected from alkyl groups (including cycloalkyl), aryl groups, alkaryl groups, or arylalkyl groups. R1, R2, and R3, for example, can represent alkyl groups that contain from 1 to 8 carbon atoms. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride and benzyl isopropyl aluminum hydride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include tridodecylaluminum, tri-n-octylaluminum, tri-n-decylaluminum, triethyl aluminum (TEAL), tri-n-propyl aluminum, triisobutyl aluminum (TIBAL), trihexyl aluminum, and diisobutyl aluminum hydride (DIBA-H).

In one example, the organoaluminum compound can contain less than 13 carbon atoms. Such organoaluninum compounds include trimethylaluminum, triethylaluminum, tri-n-propylaluminum, tri-iso-propylaluminum, tri-isbutylaluminum, tri-t-butylaluminum, and tri-n-butylaluminum.

The molar ratio of the organoaluminum compound to the group IIa metal salt is within the range of about 0.1:1 to about 20:1. In another example, the molar ratio is from about 0.5:1 to about 15:1. In another example, the molar ratio of the organoaluminum compound to the group IIa metal salt is within the range of about 1:1 to about 8:1. In yet another example, the molar ratio is within the range of about 2:1 to about 6:1.

The organoaluminum compound will normally be present in the polymerization medium in an amount that is within the range of about 1.2 to about 2.0 phm (parts by 100 parts by weight of total monomer). In another example, from about 1.4 phm to about 1.8 phm of the organoaluminum compound can be utilized.

The optional amine compound of the catalyst system can be selected from (1) a heterocyclic aromatic or non-aromatic compound which includes a ring structure with one or more nitrogen atoms as part of the ring; (2) an aromatic compound including a ring structure substituted with at least one amino group and at least one polar functionality containing group selected from a carboxyl group or a hydroxyl group; (3) a diamine compound; or (4) an aliphatic amine which includes a $C_1$-$C_{20}$ alkyl group.

The heterocyclic aromatic compounds, which are defined by a ring structure with one or more nitrogen atoms as part of the ring, can include, for example, substituted or unsubstituted 3-, 4-, 5-, or 6-membered ring structures with one or more nitrogen atoms as part of the ring. These compounds may include fused ring structures. Examples of the heterocyclic aromatic compounds can include pyrrole, quinoline, pyridine, 2-picoline, 3-picoline, 4-picoline, pyridazine, pyrimidine, pyrazine, and others known to those having ordinary skill in the art.

The heterocyclic non-aromatic compounds, which are defined by a ring structure with one or more nitrogen atoms as part of the ring, can include, for example, substituted or unsubstituted 3-, 4-, 5-, or 6-membered ring structures with one or more nitrogen atoms as part of the ring. These compounds may include fused ring structures. Examples of the heterocyclic non-aromatic compounds can include pyrolidine, piperidine, piperazine, N,N-dimethyl piperazine, N-methyl piperazine, and others known to those having ordinary skill in the art.

The aromatic compounds, which are defined by a ring structure substituted with at least one amine and at least one polar functionality containing group selected from a carboxyl group or a hydroxyl group, can include, for example, 3-, 4-, 5-, or 6-membered substituted rings, such substitution including at least one amino group and at least one polar functionality containing group selected from a carboxyl group or a hydroxyl group. In one example, the amine is a primary amine. These compounds also may include fused ring structures. Examples of the aromatic compound may include para-aminobenzoic acid (PABA), para-aminophenol (AP), as well as others known to those having ordinary skill in the art.

The diamine compounds can include aliphatic diamines or bicyclic chelating diamine compounds. The bicyclic chelating diamine compounds generally may be defined as two fused rings with at least one ring including two nitrogen atoms. For example, the bicyclic chelating diamine compound may include 1,4-diazabicyclo[2.2.2]octane (DABCO) and others known to those having ordinary skill in the art. The aliphatic diamines can include primary, secondary, or tertiary amines, or combinations thereof. In one example, the aliphatic diamine is an aliphatic bis-primary diamine, such as ethylene diamine or 1,3-diaminopropane. In yet another embodiment, the aliphatic diamines is an aliphatic bis-tertiary diamine, such as N,N,N',N'-tetramethylethylene diamine ("TMEDA").

The aliphatic amines, i.e., monoamines, which include a $C_1$-$C_{20}$ alkyl group, can include a primary, secondary, or tertiary amine. In one example, the aliphatic amine is a primary amine, such as octyl amine, n-butyl amine, or others known to those having ordinary skill in the art.

The molar ratio of the amine compound to the group IIa metal salt is within the range of about 0.1:1 to about 20:1. In another example, the molar ratio is from about 0.5:1 to about 15:1. In another example, the molar ratio of the amine compound to the group IIa metal salt is within the range of about 1:1 to about 8:1. In yet another example, the molar ratio is within the range of about 1:1 to about 6:1.

The amine compound will normally be present in the polymerization medium in an amount, which is within the range of about 0.20 to about 8.00 phm (parts by 100 parts by weight of total monomer).

The optional organomagnesium compound of the catalyst may include any magnesium compound that contains at least one magnesium-carbon bond and that is soluble in a hydrocarbon solvent. Some specific examples of suitable organomagnesium compounds include dihydrocarbylmagnesium compounds, such as diethylmagnesium, di-n-propylmagnesium, diisopropylmagnesium, dibutylmagnesium, dihexylmagnesium, diphenylmagnesium, dibenzylmagnesium, and mixtures thereof, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and mixtures thereof.

Coupling agents also can be used when synthesizing the rubbery polymers to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and others known to those having ordinary skill in the art. In one example, the divinylaromatic hydrocarbons are used, such as divinylbenzene, in either its ortho, meta or para isomer. In another example, commercial divinylbenzene, which is a mixture of the three isomers and other compounds, is used.

While any multiepoxide can be used, in one example, liquids are used since they are more readily handled and form a relatively small nucleus for the radial polymer. In another example, the multiepoxides are epoxidized hydrocarbon polymers, such as epoxidized liquid polybutadienes. In another example, epoxidized vegetable oils, such as epoxidized soybean oil and epoxidized linseed oil, are used. In yet another example, the epoxy compound includes 1,2,5,6,9,10-triepoxydecane, and others known to those having ordinary skill in the art.

Examples of suitable multiisocyanates include benzene-1,2,4-triisocyanate, naphthalene-1,2,5,7-tetraisocyanate, and others known to those having ordinary skill in the art. In one example, the multiisocyanate is a commercially available product known as PAPI-1, which is a polyarylpolyisocyanate having an average of three isocyanate groups per molecule and an average molecular weight of about 380. Such a compound can be visualized as a series of isocyanate-substituted benzene rings joined through methylene linkages.

The multiimines, which are also known as multiaziridinyl compounds, can include those compounds containing three or more aziridine rings per molecule. Examples of such compounds include the triaziridinyl phosphine oxides or sulfides, such as tri(1-ariridinyl)phosphine oxide, tri(2-methyl-1-ariridinyl)phosphine oxide, tri(2-ethyl-3-decyl-1-ariridinyl)phosphine sulfide, and others known to those having ordinary skill in the art.

The multialdehydes can include 1,4,7-naphthalene tricarboxyaldehyde, 1,7,9-anthracene tricarboxyaldehyde, 1,1,5-pentane tricarboxyaldehyde and similar multialdehyde containing aliphatic and aromatic compounds. The multiketones can include 1,4,9,10-anthraceneterone, 2,3-diacetonylcyclohexanone, and others known to those having ordinary skill in the art. Examples of the multianhydrides include pyromellitic dianhydride, styrene-maleic anhydride copolymers, and others known to those having ordinary skill in the art. Examples of the diesters and multiesters include diethyladipate, triethyl citrate, 1,3,5-tricarbethoxybenzene, diethyl phathalate, ethyl benzoate, and others known to those having ordinary skill in the art.

The multihalides can include silicon tetrahalides (such as silicon tetrachloride, silicon tetrabromide and silicon tetraiodide) and the trihalosilanes, (such as trifluorosilane, trichlorosilane, trichloroethylsilane, tribromobenzylsilane and the like). In another example, the multihalide can include multihalogen-substituted hydrocarbons, such as 1,3,5-tri(bromomethyl) benzene, 2,4,6,9-tetrachloro-3,7-decadiene, and others known to those having ordinary skill in the art, in which the halogen is attached to a carbon atom which is alpha to an activating group, such as an ether linkage, a carbonyl group or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and others known to those having ordinary skill in the art.

In addition to the silicon multihalides as described hereinabove, other metal multihalides, such as those of tin, lead or germanium, also can be readily employed as coupling and branching agents. Difunctional counterparts of these agents also can be employed, whereby a linear polymer rather than a branched polymer results. Mixed coupling agents containing both silicon multihalides and tin multihalides can also be used.

In one embodiment, a range of about 0.01 to 4.5 milliequivalents of coupling agent is employed per 100 grams of monomer. In one example, about 0.01 to about 1.5 milliequivalents of the coupling agent per 100 grams of monomer is used to obtain the desired Mooney viscosity. Larger quantities tend to result in production of polymers containing terminally reactive groups or insufficient coupling. One equivalent of treating agent per equivalent of lithium is considered optimum amount for maximum branching, if this result is desired in the production line. The coupling agent can be added in the hydrocarbon solution (e.g., in cyclohexane) to the polymerization admixture in the final reactor with suitable mixing for distribution and reaction.

As discussed above, the catalyst system synthesizes rubbery polymers, such as polybutadiene rubber and styrene-butadiene rubber, having a high trans microstructure content that can be utilized in tire tread rubbers. The rubber polymers can be synthesized from conjugated diolefin monomers, such as 1,3-butadiene, isoprene, 2,3-dimethylbutadiene, and vinyl aromatic monomers, such as vinyl, divinyl, or trivinyl benzene monomers, including styrene, α-methyl styrene, p-tertiary-butyl styrene, methyl vinyl toluene, p-vinyl toluene. In one example, the monomers include 1,3 butadiene and styrene.

Non-limiting examples of the batch process in accordance with the description are now disclosed below. These examples are merely for the purpose of illustration and are not to be regarded as limiting the scope of the invention or the manner in which it can be practiced. Other examples will be appreciated by a person having ordinary skill in the art. Unless specifically indicated otherwise, parts and percentages are given by weight.

Catalyst System Preparation

The catalyst system used in the batch process was preformed. Initially, a barium compound, i.e., a barium salt of di(ethylene glycol) ethylether (BaDEGEE) (37.33% in ethylbenzene), was alkylated with an aluminum alkyl, i.e., tri-n-octylaluminum (TOA) (50% in hexanes). The molar ratio of BaDEGEE to TOA was 1:4. The BaDEGEE/TOA catalyst was prepared by slowly adding TOA at a rate of about 1 lb/min to BaDEGEE in a 30-gallon reactor. The reactor temperature was set at about 24° C. to compensate for the exotherm from the reaction of TOA with the barium salt. After the TOA is added, the temperature was set to about 70° C. for thirty minutes to provide the alkylated barium catalyst. The catalyst was then transferred to a cylinder for use in batch process.

For the batch process, just prior to batch initiation, n-butyllithium (n-BuLi) (15% in hexanes) is added to the BaDEGEE/TOA catalyst so that the molar ratio of BaDEGEE to TOA to n-BuLi is 1:4:3. After addition, the contents of the cylinder were transferred to a 5-gallon reactor, heated at about 70° C. for about 7 min to provide the catalyst system (BaDEGEE/TOA/N-BuLi), which was returned to the cylinder for use in the Examples below.

Polymerization

Polymerization of the rubbery polymer, i.e., styrene-butadiene rubber, was carried out in a 500-gallon batch reactor. A premix contained a dilute mixture of styrene and 1,3 butadiene monomers in hexane. The premix was dried over two beds of silica in a hold vessel. A weighed amount of dried premix was transferred into the reactor and heated to a desired temperature. The catalyst system was added to the premix in a desired amount. The mixture was heated slowly until the batch reaction began to exotherm, then the reaction was allowed to run its course while being monitored for solids and residuals. The reaction was shortstopped with 1.5 moles stearic acid per 10 ppm to 100 ppm BaDEGEE. 0.5 phr Polystay K, which is an antioxidant available from Goodyear Tire and Rubber Company of Akron, Ohio, was also added. The polymer cement was then analyzed.

EXAMPLE 1

In this experiment, 1800 lbs dried premix containing 18% (GC analysis—16.37%) by weight styrene and 1,3 butadiene monomers in a 38:62 ratio was charged into a 500-gallon reactor and heated to about 65° C. 0.400 mmoles catalyst system (BaDEGEE/TOA/n-BuLi) per 100 parts by weight of total monomer (based on calculated amount, not GC analysis) was added to the reactor. The mixture was heated until the reaction began to exotherm. The maximum temperature of about 116° C. was reached in about 41 min. The maximum pressure obtained was 77.0 psig.

After the batch ran for about 165 min, an additional 100 lbs dried premix containing 30% by weight 1,3 butadiene was charged into the 500-gallon reactor. At 165 min, most of the reaction was complete, as monitored by GC, and the temperature had leveled to about 93° C. The batch was then run for an additional 90 min before being shortstopped.

Table 1 below illustrates the amount of monomer in the batch process at specified times. The table illustrates that at least an additional 5% of styrene was converted into styrene butadiene rubber after the addition of more butadiene.

TABLE 1

| Time (min) | Styrene (GC analysis % wt) | Butadiene (GC analysis % wt) |
|---|---|---|
| 0 | 6.161 | 10.211 |
| 30 | 5.118 | 5.672 |
| 45 | 3.446 | 1.044 |
| 60 | 2.906 | 0.661 |
| 120 | 2.297 | 0.31 |
| 165 | 2.297 | 0.10 |
| | | add'l Butadiene added |
| 195 | 2.207 | 0.521 |
| 255 | 1.849 | 0.331 |

The styrene-butadiene rubber produced was determined to have a glass transition temperature (Tg) at about −77° C. and a melting temperature (Tm) at about −4° C. The Mooney viscosity (ML-4) at 100° C. was 43.7. The GPC measurements indicated that the polymer has a number average molecular weight (Mn) of about 280,000 g/mol and a weight average molecular weight (Mw) of about 350,000 g/mol. The polydispersity (Mw/Mn) of the resulting polymer was 1.25. Carbon-13 NMR analysis showed a trans 1,4 polybutadiene content of 77.0%, cis 1,4 polybutadiene content of 16.4%, and a 1,2 polybutadiene content of 6.4%. These microstructures were based on the total polybutadiene in the polymer. The polystyrene content was 32.9%.

Accordingly, the batch process, which includes solution polymerization using the above catalyst system, produced a styrene-butadiene rubber having high trans microstructure content as well a desirable glass transition temperature, for example. Such glass transition temperature indicates low temperature properties, which can translate into rubber compounds with good wearing properties and desirable traction properties suitable for use in tires. The rubber compounds that can be produced may further include 100% silica filler, 100% carbon black filler, or mixtures thereof, for example. The presence of a high trans microstructure content, e.g., greater than 60%, is typically beneficial for providing desirable tearing properties which can give desirable endurance to truck tires, for example. Moreover, such crystallizable high-trans polymers can be useful in building tread rubbers in tire making equipment as a result of lower shrinkage and distortion of the tread compound on extrusion. The Mooney data, for example, indicates a rubbery polymer having better wearing and tearing which can be desirable in medium and heavy truck tires for better chipping and chunking. The polydispersity value indicates a rubbery polymer having a more desirable filler and polymer interaction during processing and calendaring, which can lead to improved fuel economies.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A batch process comprising:

in a reactor, initiating copolymerization of a vinyl aromatic monomer and a conjugated diolefin monomer in the presence of a catalyst system for synthesizing a rubbery polymer having a high trans microstructure, the catalyst system including an organolithium compound, a group IIa metal salt, and an organoaluminum compound; and after a desired period of time, adding additional conjugated diolefin monomer to the reactor to convert unreacted vinyl aromatic monomer to the rubbery polymer having the high trans microstructure.

2. The batch process of claim 1 wherein initiating copolymerization of a vinyl aromatic monomer and a conjugated diolefin monomer in the presence of a catalyst system comprises initiating copolymerization of the vinyl aromatic monomer and the conjugated diolefin monomer in the presence of the catalyst system at a temperature that is within the range of about 20° C. to about 180° C.

3. The batch process of claim 1 wherein after a desired period of time, adding additional conjugated diolefin monomer to the reactor comprises after a desired period of time, adding additional conjugated diolefin monomer to the reactor in an amount of about 0.01% to about 30% of the initial % by weight conjugated diolefin monomer.

4. The batch process of claim 1 wherein after a desired period of time is defined by when less than about 20% of the initial % by weight conjugated diolefin monomer remains in the reactor.

5. The batch process of claim 1 wherein the catalyst system further includes an amine compound, an organomagnesium compound, or a mixture thereof.

6. The batch process of claim 1 wherein the vinyl aromatic monomer is styrene and the conjugated diolefin monomer is 1,3-butadiene.

7. A batch process comprising:

providing, in a reactor, a vinyl aromatic monomer and a conjugated diolefin monomer and a catalyst system for synthesizing a rubbery polymer having a high trans microstructure, the catalyst system including an organolithium compound, a group IIa metal salt, and an organoaluminum compound;

initiating copolymerization of the vinyl aromatic monomer and the conjugated diolefin monomer in the presence of the catalyst system in the reactor at a temperature that is within the range of about 20° C. to about 180° C.; and after a desired period of time, adding additional conjugated diolefin monomer to the reactor to convert unreacted vinyl aromatic monomer to the rubbery polymer having the high trans microstructure.

8. The batch process of claim 7 wherein providing, in a reactor, a vinyl aromatic monomer and a conjugated diolefin monomer and a catalyst system comprises providing, in the reactor, the catalyst system in an amount of about 0.100 mmole to about 0.900 mmol/per 100 parts by weight of total monomer.

9. The batch process of claim 7 wherein providing, in a reactor, a vinyl aromatic monomer and a conjugated diolefin monomer and a catalyst system comprises providing, in the reactor, the vinyl aromatic monomer and the conjugated diolefin monomer in about a 1:1 to about a 1:3 weight ratio.

10. The batch process of claim 7 wherein initiating copolymerization of the vinyl aromatic monomer and the conjugated diolefin monomer in the presence of the catalyst system comprises initiating copolymerization of the vinyl aromatic monomer and the conjugated diolefin monomer in the presence of the catalyst system at a temperature that is within the range of about 40° C. to about 120° C.

11. The batch process of claim 7 wherein after a desired period of time, adding additional conjugated diolefin monomer to the reactor comprises after a desired period of time, adding additional conjugated diolefin monomer in an amount of about 0.01% to about 30% of the initial % by weight conjugated diolefin monomer provided in the reactor.

12. The batch process of claim 7 wherein after a desired period of time is defined by when less than about 20% of the initial % by weight conjugated diolefin monomer provided in the reactor remains in the reactor.

13. The batch process of claim 7 wherein the catalyst system further includes an amine compound, an organomagnesium compound, or a mixture thereof.

14. The batch process of claim 7 wherein the vinyl aromatic monomer is styrene and the conjugated diolefin monomer is 1,3-butadiene.

* * * * *

UNITED STATES PATENT AND TRADEMARK OFFICE
CERTIFICATE OF CORRECTION

PATENT NO.       : 7,285,605 B1                       Page 1 of 1
APPLICATION NO.  : 11/468427
DATED            : October 23, 2007
INVENTOR(S)      : Adel Farhan Halasa et al.

It is certified that error appears in the above-identified patent and that said Letters Patent is hereby corrected as shown below:

Title Page, column 2 at (57), line 11, after "20°C" delete ".".

Title Page, column 2 at (57), line 11, change "180°" to --180°C--.

Column 2, line 21, change "180°" to --180°C--.

Column 4, line 33, after "particularly" insert --,--.

Column 10, line 35, change "Ba-(O-CH2-CH2-O-CH2-CH2-N-CH3)2" to --Ba-(O-CH$_2$-CH$_2$-O-CH$_2$-CH$_2$-N-CH$_3$)$_2$--.

Column 11, line 31, change "tri-isbutylaluminum" to --tri-isobutylaluminum--.

Column 12, line 33, change "diamines" to --diamine--.

Column 15, line 26, change "(BaDEGREE/TOA/N-BuLi)" to --(BaDEGREE/TOA/n-BuLi)--.

Column 15, line 42, change "Goodyear Tire and Rubber Company" to --The Goodyear Tire & Rubber Company--.

Column 16, line 34, after "well" insert --as--.

Signed and Sealed this

Second Day of June, 2009

JOHN DOLL
*Acting Director of the United States Patent and Trademark Office*